United States Patent
Goral et al.

(10) Patent No.: US 7,072,126 B2
(45) Date of Patent: Jul. 4, 2006

(54) TEMPERATURE COMPENSATION DEVICE FOR OPTICAL INSTRUMENTS

(75) Inventors: Avihu Goral, D.N. Misgav (IL); Ehud Shoavi, D.N. Misgav (IL); Ehud Chishinski, Nofit (IL)

(73) Assignee: Rafael Armament Development Authority Ltd., Haifa (IL)

(*) Notice: Subject to any disclaimer, the term of this patent is extended or adjusted under 35 U.S.C. 154(b) by 0 days.

(21) Appl. No.: 10/887,166

(22) Filed: Jul. 8, 2004

(65) Prior Publication Data
US 2005/0024753 A1 Feb. 3, 2005

(30) Foreign Application Priority Data
Jul. 17, 2003 (IL) ..................... 157012

(51) Int. Cl.
*G02B 7/02* (2006.01)
(52) U.S. Cl. .............. 359/820; 359/819; 359/821; 359/822
(58) Field of Classification Search ............ 359/819, 359/820, 821, 822, 823, 811, 813, 814, 824
See application file for complete search history.

(56) References Cited

U.S. PATENT DOCUMENTS

2002/0036835 A1* 3/2002 Nomura et al. ............ 359/693
2003/0099053 A1* 5/2003 Yoshikawa ................... 360/59
2004/0050694 A1* 3/2004 Yang et al. ............ 204/403.02

* cited by examiner

*Primary Examiner*—Scott J. Sugarman
*Assistant Examiner*—Brandi Thomas
(74) *Attorney, Agent, or Firm*—Merchant & Gould P.C.

(57) ABSTRACT

The present invention discloses a temperature compensation device for optical instruments which comprises a lens assembly, motor means for rotating the lens assembly about the optical axis thereof, kinematic means for producing rectilinear motion of the lens assembly in response to the rotary motion of the lens assembly, and means for determining the linear displacement and therefore the actual linear position of the lens assembly. Additionally, the device comprises thermometric means, e.g. a temperature detector, which measures the temperature of the environment and transmits the temperature to a processor which controls the actual linear position of the lens assembly through an electronic circuit. The relationship between the temperature detector reading and the corresponding desired linear position is defined by memorized means, preferably by a LUT (look-up table) or, e.g., through optimization on a sensor (ccd, IR, etc.) output (picture). At all times, the desired linear position, corresponding to the temperature detector reading, is compared to the actual linear position, and, if there is a difference, the aforesaid kinematic means is actuated by appropriate means to displace the lens assembly to the desired linear position.

10 Claims, 5 Drawing Sheets

TEMPERATURE COMPENSATION DEVICE FOR OPTICAL INSTRUMENTS

FIELD OF THE INVENTION

This invention relates to a mechanism for compensating for temperature variations in optical instruments by displacing lens assemblies along their optical axes.

BACKGROUND OF THE INVENTION

Optical instruments must retain accurate focus throughout a wide range of temperature variations. Unless the instrument is so designed that it is not sensitive to temperature, it is necessary to provide a mechanism for the active compensation of temperature variations.

Known compensation mechanisms are based on connecting the lenses to a platform having a linear motion. Some such mechanisms use stepped linear motors. They have the drawbacks, among others, that they require a large motor and expensive linear supports, have a low rigidity, and require the use of springs to close tolerances. Other such mechanisms have a continuous linear displacement. They comprise a large number of components, require a large motor and springs to close tolerances, and need special solutions to limit the range of motion.

It is a purpose of this invention to provide a mechanism for active thermal compensation, that is free from the drawbacks of prior art mechanisms.

It is another purpose of this invention to provide such a mechanism that is sensitive and precise.

It is a further purpose of this invention to provide such a mechanism that is limited in size and does not require large motors.

It is a still further purpose of this invention to provide such a mechanism that has no tolerance problems.

It is a still further purpose of this invention to provide such a mechanism that has built-in motion limitations.

It is a still further purpose of this invention to provide such a mechanism that provides a self-locking moment, which helps in controlling large and small errors and external random and steady state disturbances.

Other purposes and advantages of the invention will appear as the description proceeds.

SUMMARY OF THE INVENTION

The device of the invention comprises a lens assembly, motor means for rotating said lens assembly about the optical axis thereof, which preferably comprise at least one and more preferably two motors, kinematic means for producing rectilinear motion of the lens assembly in response to the rotary motion of said assembly, and means for determining the linear position of said lens assembly. Preferably, the motors are nano motors, but other kind of motors, such as conventional motors provided with gears, could be used in the device of this invention. Preferably, the means for determining the linear position of said lens assembly comprise optical means for reading the radial or angular displacement of said assembly on a scale mounted on the leans housing, and memory or processing means for deriving from said angular displacement the linear displacement of said assembly and therefore the actual position thereof.

Additionally, the device comprises thermometric means, e.g. a temperature detector, which measures the temperature of the environment and transmits said temperature to a processor which controls the actual linear position of the lens assembly through an electronic circuit. The relationship between the temperature detector reading and the corresponding desired linear position is defined by memorized means, preferably by a LUT (look-up table) or, e.g., through optimization on a sensor (ccd, IR, etc.) output (picture). At all times, said desired linear position, corresponding to the temperature detector reading, is compared to the actual linear position, and, if there is a difference, the aforesaid kinematic means is actuated by appropriate means to displace the lens assembly to said desired linear position The lens assembly comprises the lens or lenses, a lens housing and a disk, preferably a ceramic disk, which is preferably annular and surrounds the lens housing, in additional to conventional accessory means for mounting the lenses in the lens housing. The ceramic ring is used by the nano motors to rotate the lens assembly. It may be replaced by surface treatment to above 70 RC.

Preferably, the motor means comprise two components that are placed on the two sides of the lens assembly, preferably in symmetric positions. Each of such components comprises a nano motor. Each nano motor comprises a ceramic element or finger that is the actuating part of the motor and said ceramic element engages the ceramic disk of the lens assembly, whereby to rotate the same. An example of nano motor suitable for use in the invention is the ST-motor™ produced by NanoMotion. However, the invention may be implemented with other nano motors or with other, not nano, types of motors.

The apparatus of the invention comprises kinematic means for producing rectilinear motion of the lens assembly in response to the rotary motion of said assembly. The rectilinear motion is parallel to the optical axis of said assembly. While any kinematic means might in principle be used, it is preferred that said means comprise pin means—a pin or a plurality of pins, e.g. two pins on opposite sides—that is fixed, and a helical groove in the lens housing, whereby while this latter rotates and the pin slides along the groove, the lens housing, and therefore the whole lens assembly, is concurrently caused to shift linearly at a rate determined by the speed of the lens housing rotation and by the pitch of the helical groove. The ends of the helical groove serve to limit the angular motion of the lens assembly and constitute stoppers.

The optical means for measuring the linear displacement of the lens assembly preferably comprise an optical detector, which is placed opposite a scale on the lens housing for reading the angular progress of this latter. The optical detector and scale constitute an encoder. The linear displacement of the lens assembly, and therefore the actual linear position of said assembly, is calculated from the detector encoder reading.

It will be understood that the rotation of the lens assembly about its optical axis has no optical consequences, viz. the image produced by the lenses remains the same (within the acceptable limits), no matter how said assembly rotates about said optical axis, due to the circular symmetry of said assembly, so that from the optical viewpoint the only displacement produced by the device of the invention is the linear displacement of said lens assembly.

DETAILED DESCRIPTION OF PREFERRED EMBODIMENTS

Figure 1:
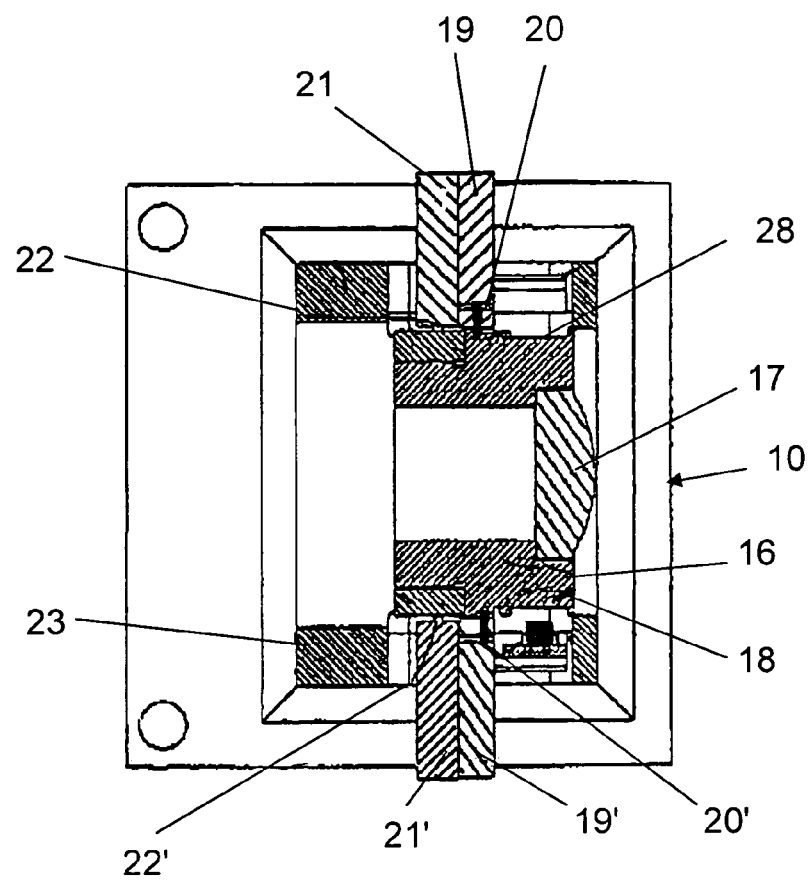
FIG. 1 is a schematic cross-section taken on a horizontal axial plane of a device according to an embodiment of the invention.

FIG. 1 to 6 schematically illustrate an embodiment of the mechanism of the invention. Numeral 10 generally designates a support structure on which the mechanism of the invention is mounted and which is only partially indicated.

The lens assembly generally indicated at 15 (see FIG. 2) comprises a lens housing 16 and a lens or lenses 17, only one of which is shown, mounted in said housing by suitable means that may be conventional and are not part of the invention, but may comprise, for example, the use of glue or mechanical mounting means. The lens housing has, in its periphery, a helical groove 18.

Two adaptors 19 and 19' are fixedly mounted on the support structure 10. One of them, or both, has a pin or pins 20–20', mounted thereon. The pin (or pins) meshes with the helical groove 18. Two nano motors are indicated at 21 and 21'. They are provided with driving fingers 22 and 22', which press against a ceramic ring 23, mounted on the periphery of the lens housing 16. The nano motors drive the lens assembly through the interaction of the driving fingers 22—22' with the ceramic ring 23, imparting a rotary motion to this latter and therefore to the entire lens assembly. The sliding of the pin 20 within the helical groove 18 produces a corresponding linear displacement of the lens assembly. An encoder 25 comprises a displacement detector 27, which reads the angular displacement of the lens assembly on a scale 28 formed from the periphery of the lens housing 16. The corresponding linear displacement is calculated by a processor (not shown) and is transmitted to a LUT (look-up table), not shown. To each temperature corresponds a desired linear position of the lens assembly, such as to compensate the optical effect of the temperature. The correspondence between temperatures and desired, viz. compensating, linear position of the lens assembly is registered in the LUT, which therefore continuously outputs the desired linear position and transmits it to the processor. The signal of the encoder or the reading of the LUT may also produce a corresponding optical signal registered or displayed on a screen. The signal of detector 27 or the reading of the LUT may also produce a corresponding optical signal registered or displayed on a screen.

The processor therefore receives a signal defining the actual angular position of the lens assembly, from which it calculates the corresponding actual linear position, and a signal defining the desired linear position of the lens assembly. Whenever they differ, the kinematic means for producing rectilinear motion of the lens assembly, trough its rotary motion, must be actuated to bring the lens assembly to its desired linear position. The kinematic means comprise motors and are actuated by actuating the motors, to rotate in one or the other direction, until the said desired linear position is reached. Skilled persons will know several ways to produce this. For example, the motors can be actuated to rotate in one or the other direction by a suitable electronic circuit. Said circuit can be manually controlled by a skilled operator, in which case the device will comprise a display on which the operator will read both the said desired and actual linear positions. However, it is preferred that the electronic circuit, and therefore the motors, be actuated automatically. For this purpose, a control circuit or processor can be provided which will sense the difference between desired and actual linear position of the lens assembly and will close the said electronic circuit whenever they differ, actuating the motors in one or the other direction depending on the sign of the difference between said linear positions, and will open the circuit when said difference has become zero.

Figure 1A:
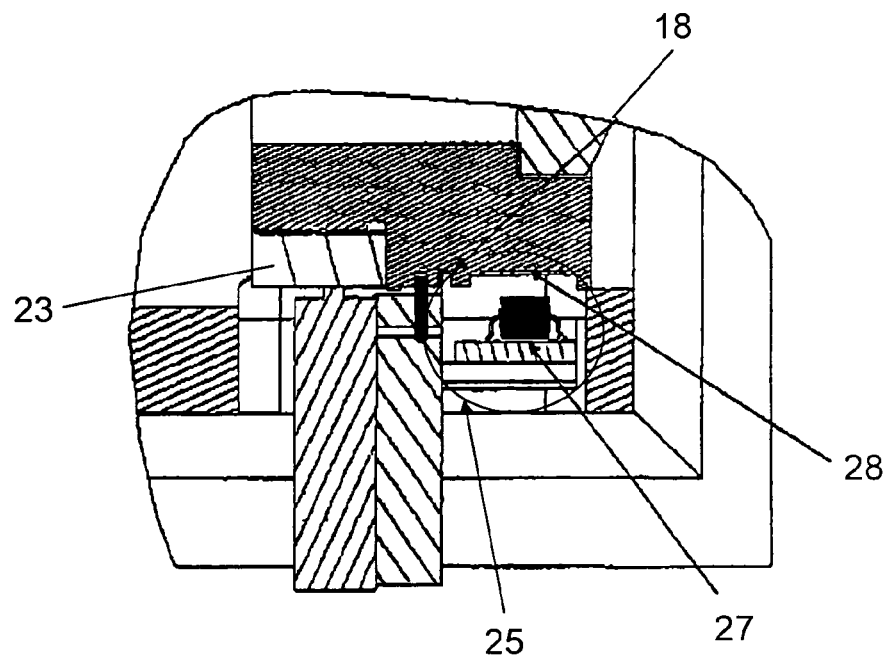
FIG. 1A is an enlarged detail of FIG. 1.
Figure 2:
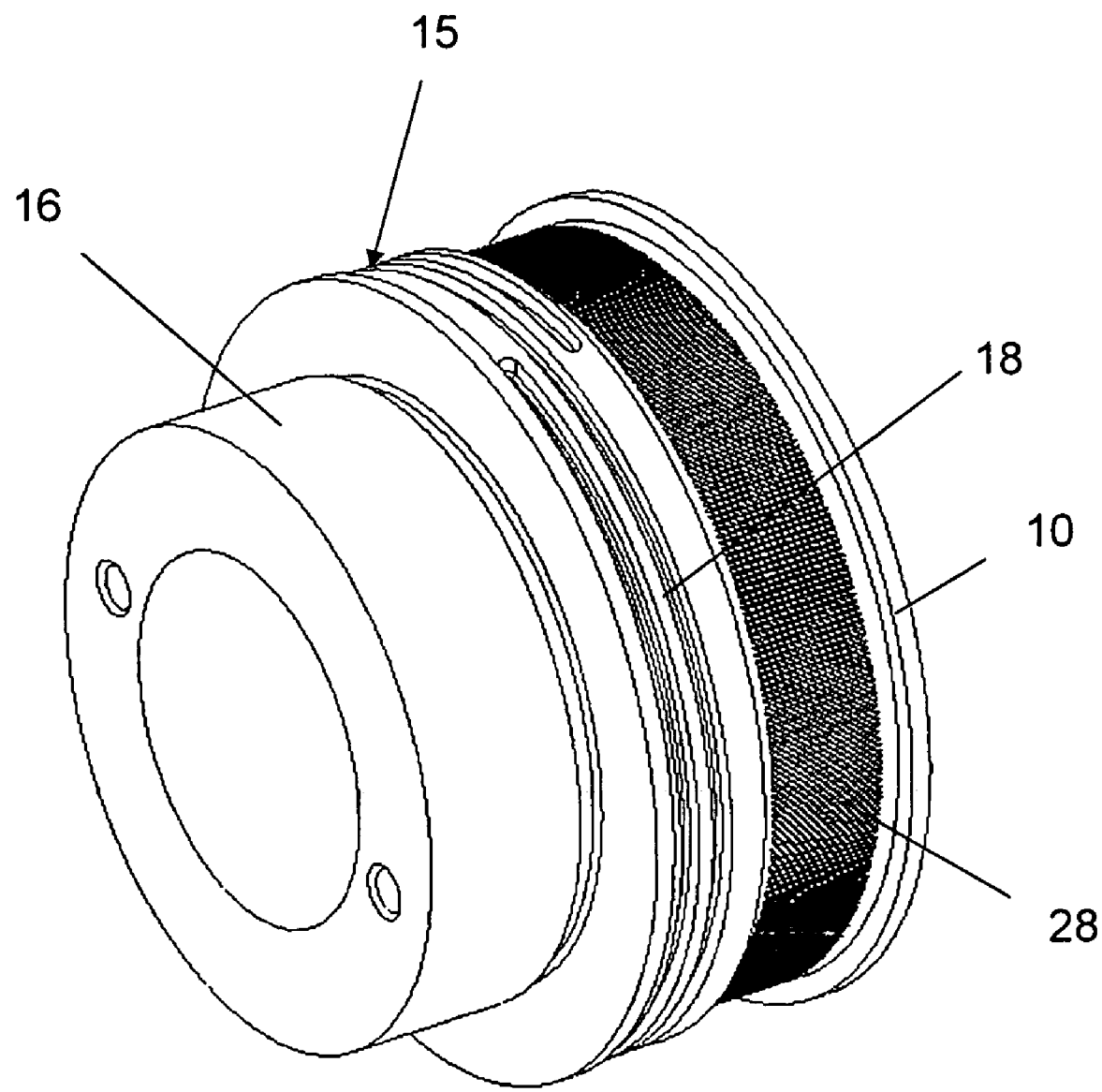
FIG. 2 is a perspective view of the lens assembly.
Figure 3:
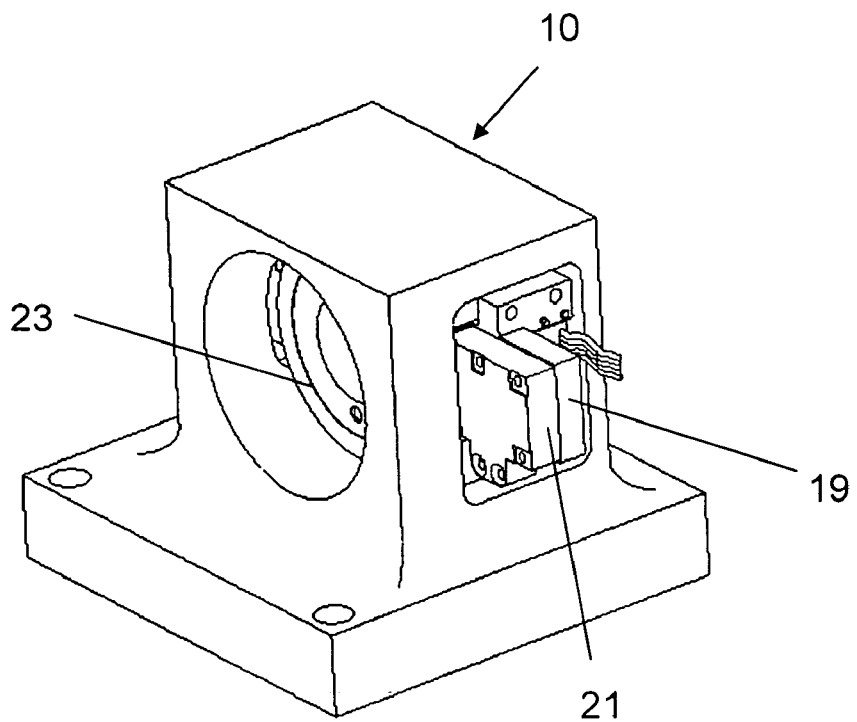
FIG. 3 is a perspective view of a support having mounted therein the device of FIG. 1.
Figure 4:
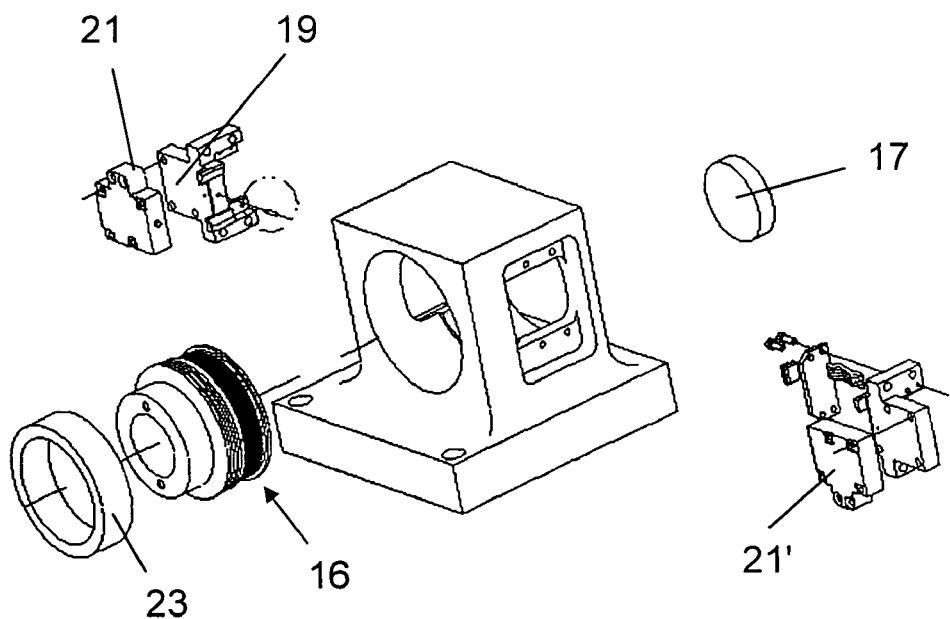
FIG. 4 is an exploded perspective view of FIG. 3.
Figure 5:
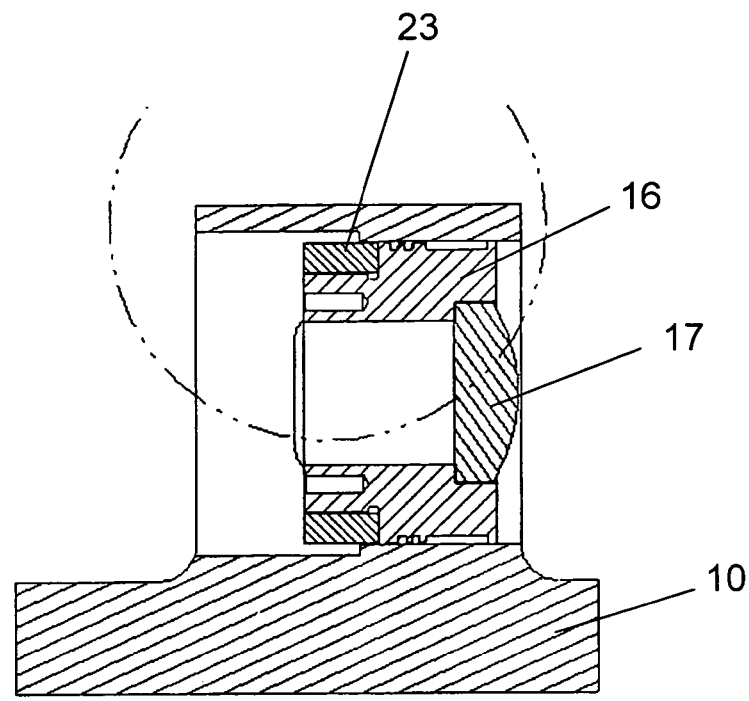
FIG. 5 is a schematic cross-section taken on a vertical axial plane of the device of FIG. 1.
Figure 6:
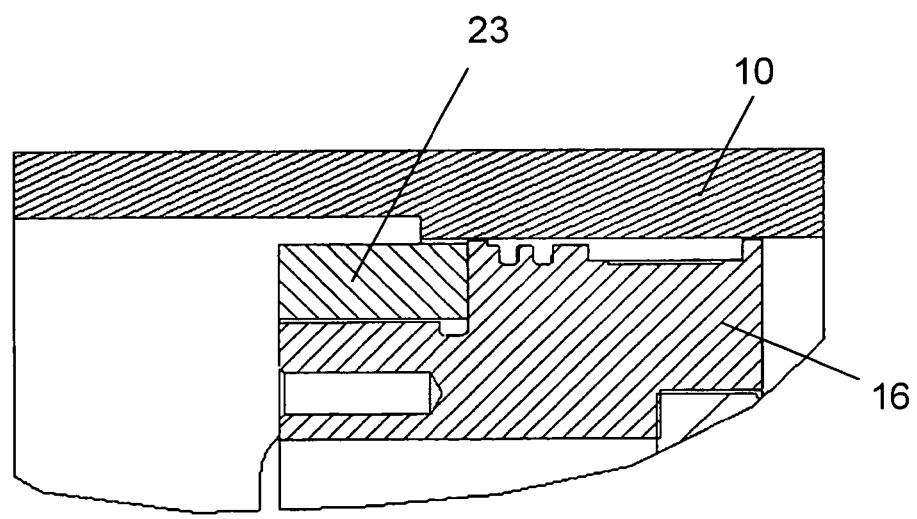
FIG. 6 is an enlarged detail of FIG. 5.
Figure 7:
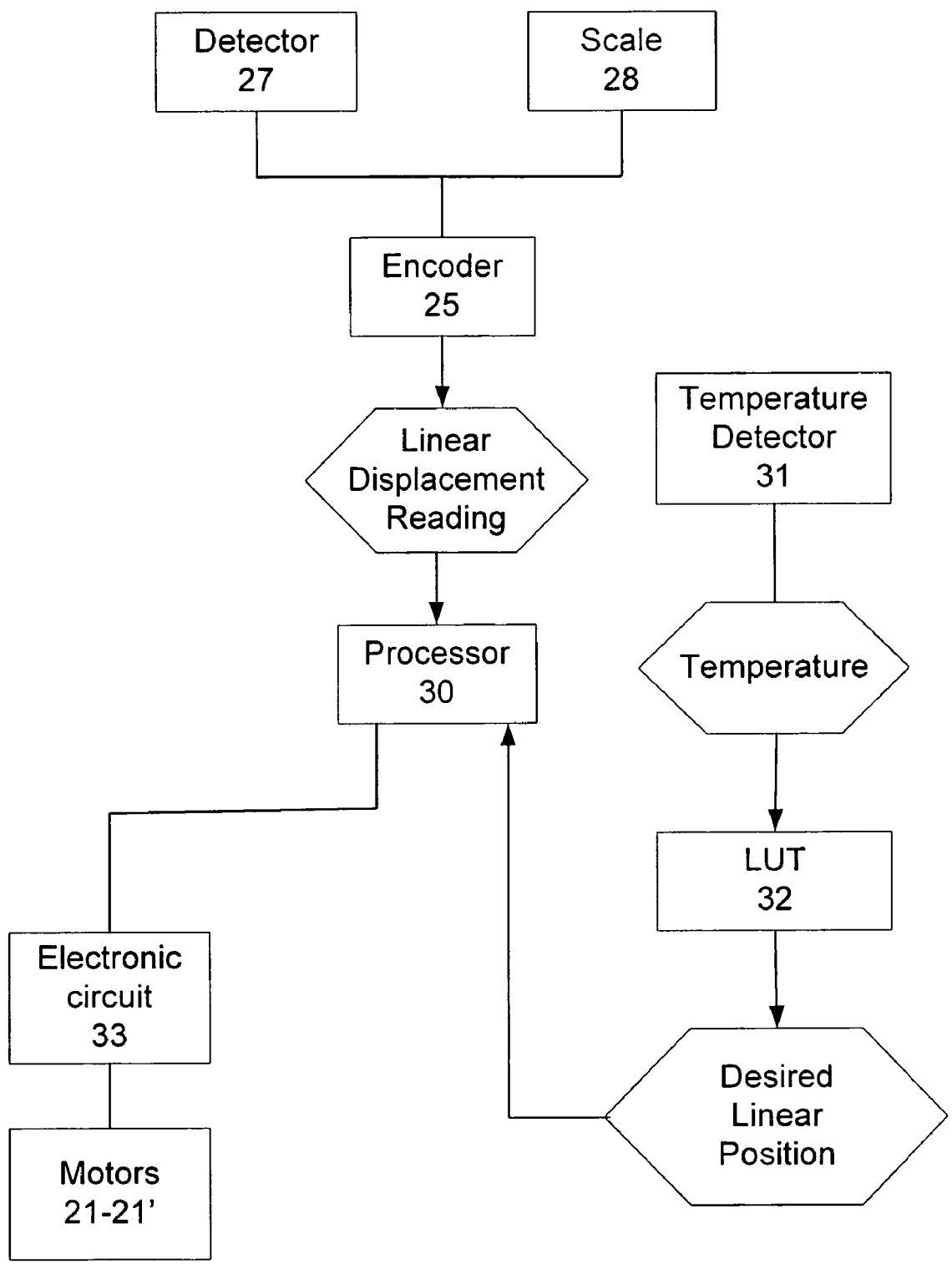
FIG. 7 is a block diagram schematically illustrating the operation of an embodiment of the invention.

FIG. 7 is a block diagram schematically illustrating the operation of an embodiment of the invention. Displacement detector 27 reads the angular displacement on scale 28. Encoder 25, which includes the scale and the detector (as better seen in the detail of FIG. 1A), transmits said angular displacement to a processor 30, which calculates the corresponding linear displacement and the actual linear position of the lens assembly 15 on the lens housing 16. Temperature detector 31 reads the temperature of the environment of the apparatus and transmits its reading to LUT 32. LUT 32 determines the corresponding desired linear position of the lens assembly and transmits it to processor 30. Processor 30 compares the actual to the desired linear position of the lens assembly, and, if there is a difference, closes electronic circuit 33 which actuates the nano motors 21–21', in one or the other direction as the case may be.

An embodiment has been described only to illustrate the invention and it is to be understood that the invention can be carried out with many modifications, adaptations and variations, without departing from its spirit or exceeding the scope of the claims.

The invention claimed is:

1. Temperature compensation device for optical instruments, comprising:
   a. a lens assembly;
   b. motor means for rotating said lens assembly about the optical axis thereof;
   c. kinematic means for producing rectilinear motion of said lens assembly in response to the rotary motion of said lens assembly;
   d. thermometric detector means for reading environment temperature;
   e. memory means for determining from the thermometric detector reading the desired linear position of said lens assembly; and
   f. processor means for comparing the actual linear position of said lens assembly to the desired linear position of said lens assembly and for actuating said motor means for rotating said lens assembly, in case of difference between said positions, to bring said lens assembly to said desired linear position.

2. Device according to claim 1, further comprising optical means for reading the angular displacement of said lens assembly, wherein the processing means is further adapted to determine the actual angular position and therefore the actual linear position of said lens assembly and to calculate from said angular displacement the corresponding linear displacement.

3. Device according to claim 1, wherein the motor means are nano motors.

4. Device according to claim 1, wherein the lens assembly comprises the lenses, a lens housing and a ceramic disk, in addition to conventional accessory means for mounting the lenses in the lens housing.

5. Device according to claim 4, wherein the ceramic disk is annular and surrounds the lens housing.

6. Device according to claim 1, wherein the motor means comprise two components that are placed ante two sides of the lens assembly.

7. Device according to claim 6, wherein the two motor components are in symmetric positions.

8. Device according to claim 4, wherein the lens assembly is surrounded by an annular ceramic disk and the motor means comprise nano motors, wherein each nano motor comprises a ceramic element which engages said ceramic disk to rotate the lens assembly.

9. Temperature compensation device for optical instruments, comprising:
- a lens assembly;
- a motor for rotating said lens assembly about the optical axis thereof;
- kinematic means for producing rectilinear motion of said lens assembly in response to the rotary motion of said lens assembly;
- wherein the kinematic means comprise a fixed pin engaging a helical groove in the lens housing, whereby while this latter rotates, said pin is also caused to shift linearly at a rate determined by the speed of rotation and byte pitch of said helical groove.

10. Temperature compensation device for optical instruments, comprising:
- a lens assembly;
- a motor for rotating said lens assembly about the optical axis thereof;
- kinematic means for producing rectilinear motion of said lens assembly in response to the rotary motion of said lens assembly;
- wherein the optical means for reading the angular displacement of the lens assembly comprise an optical detector which is placed opposite a scale on the lens housing.

* * * * *